United States Patent
Kang et al.

(10) Patent No.: US 12,371,006 B2
(45) Date of Patent: Jul. 29, 2025

(54) METHOD AND APPARATUS FOR AUTONOMOUS PARKING ASSISTANCE CONSIDERING AN AVAILABLE REAR PARKING SPACE

(71) Applicants: HYUNDAI MOTOR COMPANY, Seoul (KR); KIA CORPORATION, Seoul (KR)

(72) Inventors: Minchul Kang, Uiwang-si (KR); Inmook Kim, Seoul (KR); Taejin Jang, Incheon (KR); Junho Yang, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 77 days.

(21) Appl. No.: 18/228,458

(22) Filed: Jul. 31, 2023

(65) Prior Publication Data
US 2024/0300479 A1 Sep. 12, 2024

(30) Foreign Application Priority Data
Mar. 6, 2023 (KR) .......... 10-2023-0028961

(51) Int. Cl.
*B60W 30/06* (2006.01)
*B60Q 1/50* (2006.01)
*B60W 50/14* (2020.01)

(52) U.S. Cl.
CPC .......... *B60W 30/06* (2013.01); *B60Q 1/5035* (2022.05); *B60Q 1/507* (2022.05); *B60W 50/14* (2013.01); *B60Q 2400/50* (2013.01); *B60W 2050/143* (2013.01); *B60W 2050/146* (2013.01); *B60W 2540/215* (2020.02); *B60W 2554/4044* (2020.02); *B60W 2554/4045* (2020.02); *B60W 2556/40* (2020.02)

(58) Field of Classification Search
None
See application file for complete search history.

(56) References Cited

U.S. PATENT DOCUMENTS

| | | | |
|---|---|---|---|
| 2015/0127222 A1* | 5/2015 | Cunningham, III | G08G 1/162 701/41 |
| 2020/0148196 A1* | 5/2020 | Lim | G08G 1/0125 |
| 2020/0202716 A1* | 6/2020 | Edwards | G08G 1/096855 |
| 2020/0250977 A1* | 8/2020 | Kim | G06V 20/586 |

* cited by examiner

*Primary Examiner* — John F Mortell
(74) *Attorney, Agent, or Firm* — Lempia Summerfield Katz LLC

(57) ABSTRACT

A method and an apparatus for providing autonomous parking assistance by considering a rear parking space being vacated is provided. The apparatus for autonomous parking assistance includes a range setting unit for determining information related to a target parking space for executing parking of an ego car in a parking lot, a rear environment detection unit for detecting whether an existing parked vehicle in a rear parking space located rearwardly of the ego car is leaving, and an automatic parking control unit for controlling parking of the ego car based on the information related to the target parking space and whether the existing parked vehicle is leaving.

20 Claims, 6 Drawing Sheets

METHOD AND APPARATUS FOR AUTONOMOUS PARKING ASSISTANCE CONSIDERING AN AVAILABLE REAR PARKING SPACE

CROSS-REFERENCE TO RELATED APPLICATIONS

This application is based on, and claims priority to, Korean Patent Application Number 10-2023-0028961, filed on Mar. 6, 2023, the disclosure of which is incorporated by reference herein in its entirety.

TECHNICAL FIELD

The present disclosure in some embodiments relates to a method and an apparatus for providing autonomous parking assistance by considering a rear parking space being vacated.

BACKGROUND

The statements in this section merely provide background information related to the present disclosure and do not necessarily constitute prior art.

A remote parking pilot (RPP) system is a parking convenience feature that allows a driver to park and unpark a vehicle by remote control from outside the vehicle.

Using wide-angle cameras, radar sensors, lidar sensors, ultrasonic sensors, and the like mounted on the vehicle, the RPP system may detect in real-time the driving situation, parking environment, and hazards of the vehicle.

Furthermore, based on a precise map of a parking lot, the RPP system may generate a travel path from a remote autonomous parking zone set in the parking lot to a target parking area and control unmanned driving in the parking lot.

FIG. 1 is a diagram illustrating the operation of a conventional RPP system, and FIG. 2 is a diagram illustrating a case where a new parking space is available thanks to an existing parked vehicle leaving a parking space behind a car, such as an ego car 100, while the ego car 100 is searching for a parking space.

As shown in FIG. 1, when the ego car 100 activates its internal RPP function upon arriving at the remote autonomous parking zone 110, a conventional RPP system performs the parking space search by using various vehicle sensors such as a wide-angle camera 101, a lidar sensor 102, and the like.

When searching for and parking in the nearest empty parking space, a conventional RPP system searches for an empty parking space ahead of the ego car 100 while advancing the ego car 100 forward, and when the conventional RPP system finds an empty first parking space 111, it automatically parks the ego car 100 in the first parking space 111.

However, as shown in FIG. 2, there may be a case where the ego car 100 has passed a second parking space 112 and come to pass a starred first spot 210, when an existing parked vehicle exits the second parking space 112, which is now located behind the ego car 100.

With the conventional RPP system, even when the second parking space 112 changes to a parkable state (i.e., a state in which the space can be parked in), there is no function available to detect this change at the first spot 210 and automatically park the ego car 100.

It is not only inefficient to find the first parking space 111 farther away than the second parking space 112 and park the ego car 100 in the further away first parking space 111, but there is a high possibility that a driver also wants to park in the second parking space 112. Therefore, an improved autonomous parking assistance method is required to move the ego car 100 to the second parking space 112, and park the ego car 100 there.

SUMMARY

According to at least one embodiment, the present disclosure provides an apparatus for autonomous parking assistance, including a range setting unit, a rear environment detection unit, and an automatic parking control unit. The range setting unit is configured to determine information related to a target parking space for executing the parking of an ego car in a parking lot. The rear environment detection unit is configured to detect whether an existing parked vehicle in a rear parking space located rearwardly of the ego car is leaving. The automatic parking control unit is configured to control the parking of the ego car based on the information related to the target parking space and whether the existing parked vehicle is leaving.

According to another embodiment, the present disclosure provides a method for autonomous parking assistance, including performing a range setting to determine information related to a target parking space for executing parking of an ego car in a parking lot, performing a rear environment detection to detect whether an existing parked vehicle in a rear parking space located rearwardly of the ego car is leaving, and performing an automatic parking control to control parking of the ego car based on the information related to the target parking space and whether the existing parked vehicle is leaving.

DETAILED DESCRIPTION

Figure 1:
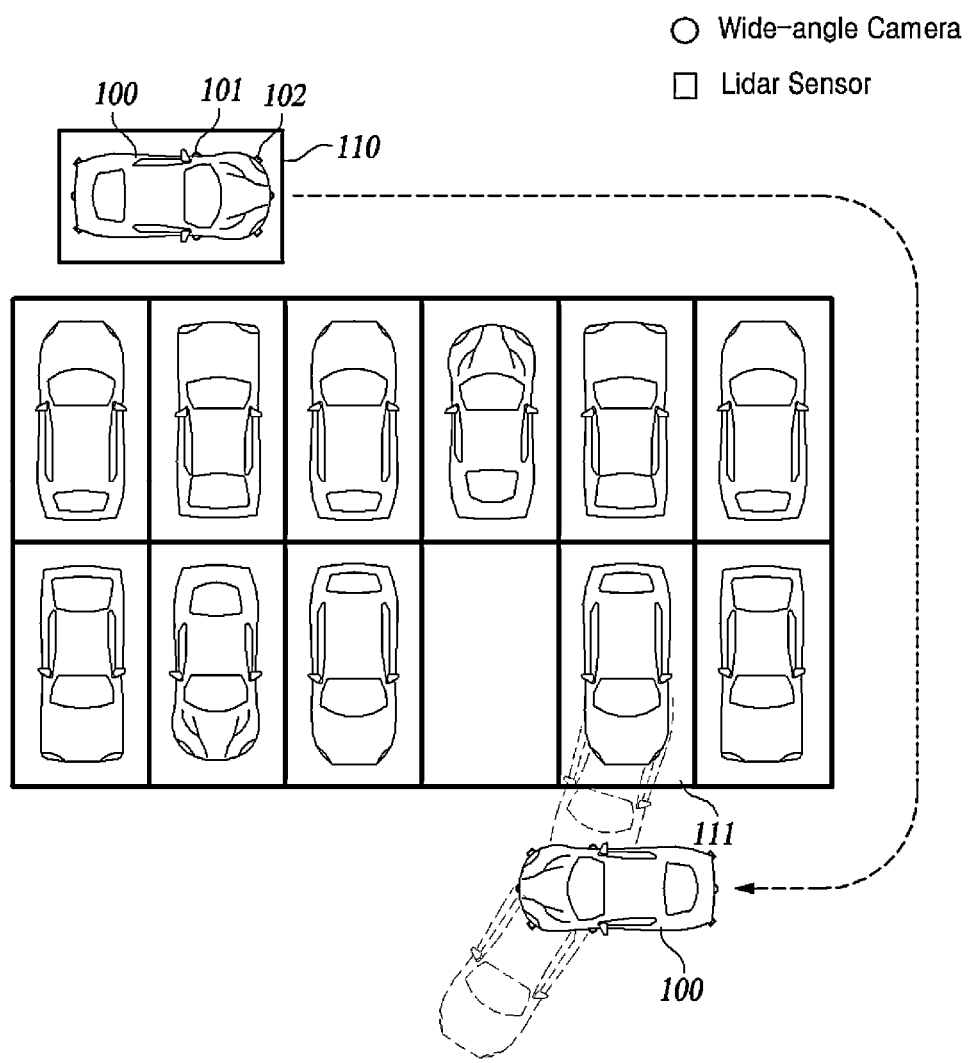
FIG. 1 is a diagram illustrating the operation of a conventional RPP system.
Figure 2:
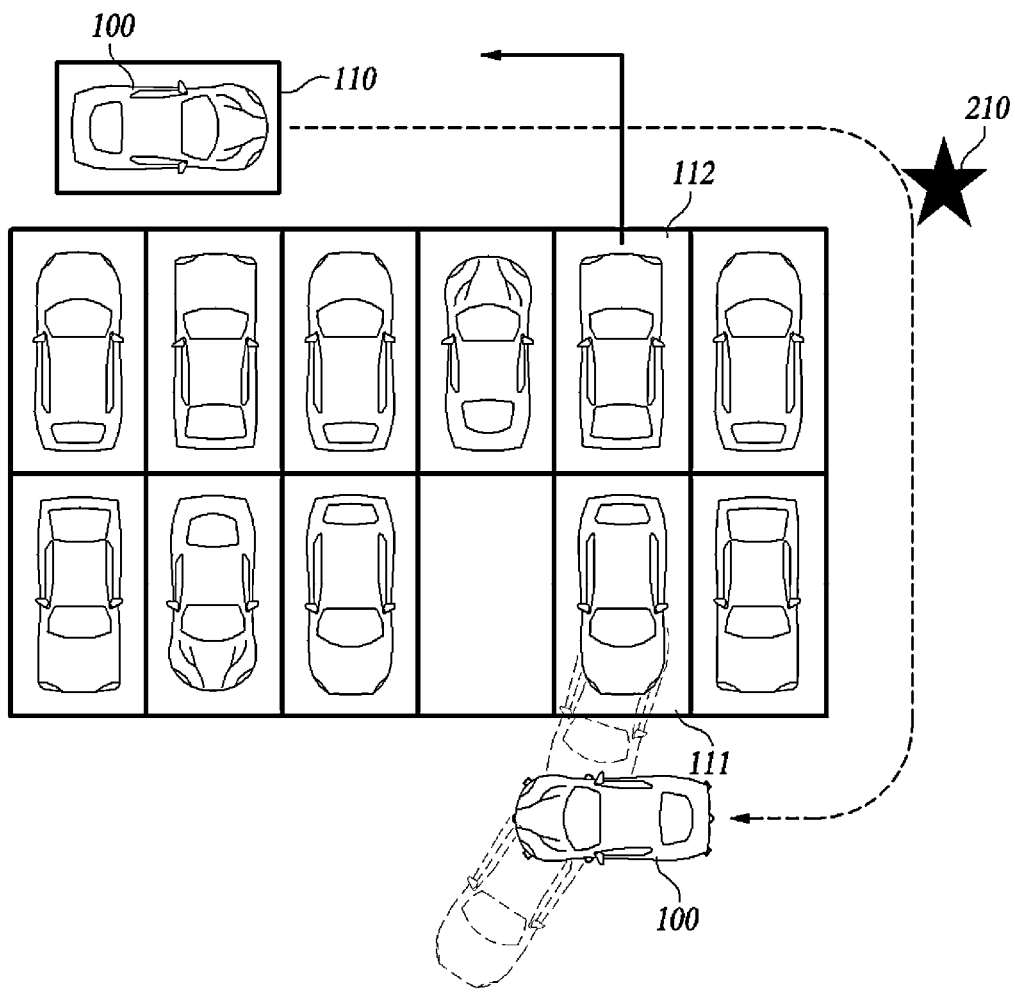
FIG. 2 is a diagram illustrating a case where a new parking space is available thanks to an existing parked vehicle leaving a parking space behind an ego car 100 while the ego car 100 is searching for a parking space.

Aspects of the present disclosure provide an autonomous parking assistance apparatus and method taking into account a rear parking space being vacated.

Unrestricted to those aspects set forth herein, the present disclosure has other aspects that should become more apparent to one of ordinary skill in the art to which the present disclosure pertains from the detailed description of the present disclosure as follows.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions when considered to obscure the subject of the present disclosure is omitted for the purpose of clarity and for brevity.

Various ordinal numbers or alpha codes such as first, second, i), ii), a), b), and the like, are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

When a component, device, element, or the like of the present disclosure is described as having a purpose or performing an operation, function, or the like, the component, device, or element should be considered herein as being "configured to" meet that purpose or to perform that operation or function.

The description of the present disclosure to be presented below in conjunction with the accompanying drawings is intended to describe embodiments of the present disclosure and is not intended to represent the only embodiments in which the technical idea of the present disclosure may be practiced.

Figure 3:
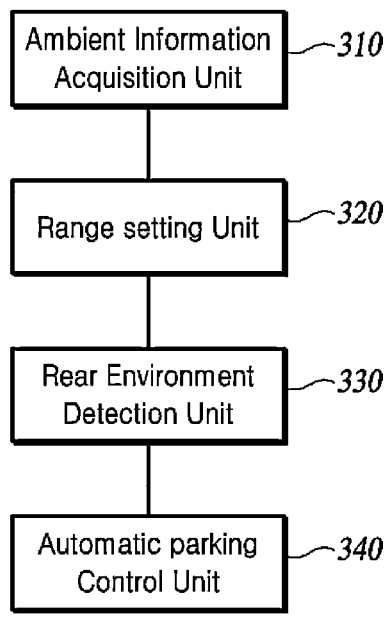
FIG. 3 is a functional block diagram illustrating an autonomous parking assistance apparatus according to at least one embodiment of the present disclosure.

FIG. 3 is a functional block diagram illustrating an autonomous parking assistance apparatus 300 according to at least one embodiment of the present disclosure.

The autonomous parking assistance apparatus 300 according to at least one embodiment of the present disclosure may be implemented including an ambient information acquisition unit 310, a range setting unit 320, a rear environment detection unit 330, and an automatic parking control unit 340.

Not all of the blocks illustrated in FIG. 3 are necessarily required components, and in other embodiments, some of the blocks included in FIG. 3 may be added, changed, or deleted. Further, the components illustrated in FIG. 3 represent functionally distinct elements, and at least one or more of the components may be implemented in a form of integrated components in an actual physical environment.

The ambient information acquisition unit 310 obtains ambient information including images around a car, such as an ego car 100, by using various vehicle sensors such as a wide-angle camera 101, a lidar sensor 102, and the like mounted on the ego car 100. The ambient information acquisition unit 310 provides the ego car's surrounding images necessary for performing the operations of the rear environment detection unit 330 and the automatic parking control unit 340 as described below.

The wide-angle camera 101 and the lidar sensor 102 are described as being used to obtain the ego car's surrounding images, but the present disclosure is not limited thereto, and various sensors such as radar sensors and ultrasonic sensors may be used as vehicle sensors.

The range setting unit 320 sets information related to a target parking space for assisting parking of the ego car in the parking lot.

The range setting unit 320 may set a search range for searching for candidate parking spaces as the information related to the target parking space.

The search range for the candidate parking space searching may include the number of candidate parking spaces to be searched.

The range setting unit 320 may set one or multiple candidate parking spaces to be searched. For example, the range setting unit 320 may set one candidate parking space to be searched or three candidate parking spaces to be searched for determining a target parking space.

The rear environment detection unit 330 detects whether an existing parked vehicle in the rear parking space located behind the ego car is leaving the rear parking space.

The automatic parking control unit 340 controls the parking of the ego car based on the information related to the target parking space, including the number of candidate parking spaces to be searched, and whether the existing parked vehicle in the rear parking space is leaving the parking space.

The automatic parking control unit 340 searches for candidate parking spaces in the parking lot based on the information related to the target parking space to determine the target parking space. The method of searching for candidate parking spaces by the automatic parking control unit 340 is outside the scope of the present disclosure, and therefore, no further detailed description is given thereof.

When the number of candidate parking spaces to be searched is set to one, the automatic parking control unit 340 may search for parking spaces until a first empty parking space is found, determine the first empty parking space as the target parking space, and control the ego car 100 to be parked in the target parking space.

As a method performed by the automatic parking control unit 340 for controlling the parking of the ego car 100 in the target parking space, the automatic parking control unit 340 may be configured to fully and automatically control the forwarding, reversing, and steering of the ego car 100 to park the same while detecting obstacles by using received images around the target parking space. The automatic parking control unit 340 may also receive forward and/or backward commands of the ego car 100 from a vehicle remote control device of a driver who got out of the ego car 100, and automatically steer the ego car 100 to have it parked in the target parking space while detecting obstacles by using images around the ego car 100. Additionally, in a situation where the driver within the ego car 100 directly drives the ego car 100 forward and backward while monitoring the situation behind the ego car 100 displayed on a rear view monitor (RVM) or a surround view monitor (SVM), the automatic parking control unit 340 may also automatically control steering of the ego car 100 to have it parked in the target parking space while detecting obstacles by using images surrounding the target parking space. The specific method by which the automatic parking control unit 340 automatically parks the ego car 100 in the target parking space is outside the scope of the present disclosure, and therefore, a further detailed description thereof is omitted.

When the number of candidate parking spaces to be searched is set to two, the automatic parking control unit 340 may search for parking spaces until a first empty parking space is found, determine the first empty parking space as a first candidate parking space, and store information on the first candidate parking space as an item in a parking space map.

After storing the information on the first candidate parking space, the automatic parking control unit 340 further searches for a second candidate parking space while advancing the ego car 100. When, in the process of searching for the second candidate parking space, the automatic parking control unit 340 finds a second parking space that is available for parking, it may determine the second parking space as the second candidate parking space and store information on the second candidate parking space as an item in the parking space map.

The information on each candidate parking space discovered may include the location of the parking space, the size of the occupying vehicle, and the size of the parking space.

The automatic parking control unit 340 may display a screen for a driver to select one among the multiple candidate parking spaces (i.e., two candidate parking spaces) that were searched, and receive the driver's selection of one candidate parking space among the multiple candidate parking spaces. The automatic parking control unit 340 may determine the selected single candidate parking space as a target parking space, and control the ego car 100 to be parked in the target parking space.

The automatic parking control unit 340 may receive information on the departure of the existing parked vehicle from the rear environment detection unit 330 during searching for the candidate parking space. Upon receiving information on the departure of the existing parked vehicle, the automatic parking control unit 340 may search for the candidate parking space in consideration of the departure of the existing parked vehicle.

Figure 4A:
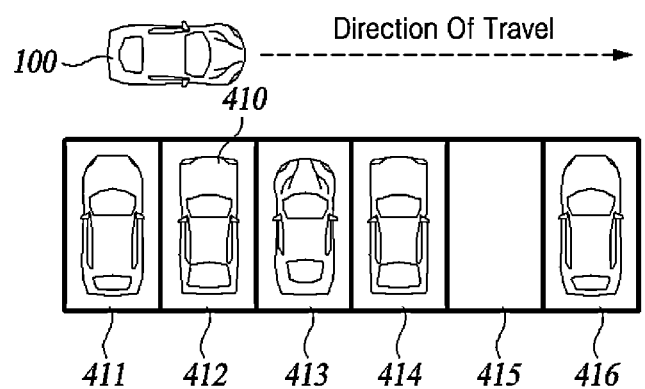
FIGS. 4A, 4B, and 4C are diagrams illustrating a case where an existing parked vehicle leaves its parking space behind the ego car 100 while the ego car 100 is searching for a candidate parking space.
Figure 4B:
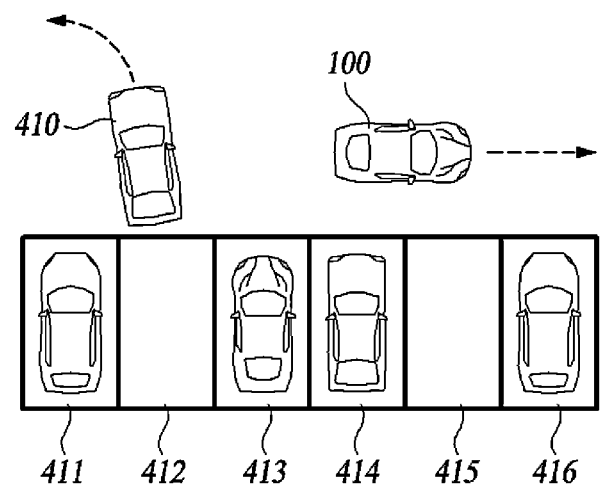
Figure 4C:
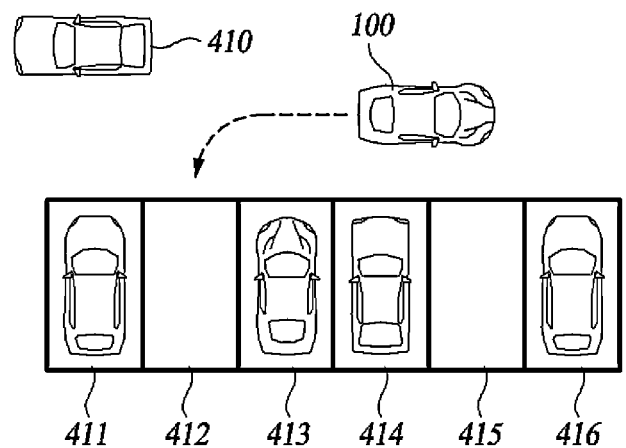

FIGS. 4A, 4B, and 4C are diagrams illustrating a case where an existing parked vehicle leaves its parking space behind the ego car 100 while the ego car 100 is searching for a candidate parking space.

As shown in FIGS. 4A and 4B, it may happen that an existing parked vehicle 410 behind the ego car 100 exits the parking space 412 when the ego car 100 is driving within a parking lot to search for candidate parking spaces.

When the number of candidate parking spaces to be searched is set to one by the range setting unit 320, the automatic parking control unit 340 performs the searching for one candidate parking space. In the process of the ego car 100 searching for a candidate parking space, before determining a first unoccupied parking space 415 to be a candidate parking space, it may be detected that the existing parked vehicle 410 is leaving the rear parking space 412. When the rear environment detection unit 330 detects the existing parked vehicle 410 leaving the rear parking space 412, the automatic parking control unit 340 may determine the rear parking space 412 as the target parking space, and control reversing and steering of the ego car 100 to the rear parking space 412 to park the ego car 100 in the rear parking space 412.

The automatic parking control unit 340 may be implemented to display a screen for selecting, by a driver, whether or not to park the ego car 100 in the rear parking space 412. Before reversing the ego car 100 into the rear parking space 412, the automatic parking control unit 340 may receive the driver's selection as input.

Additionally, when the ego car 100 detects the existing parked vehicle 410 leaving the rear parking space 412 during the process of searching for a candidate parking space, the automatic parking control unit 340 may receive a selection from the driver as to whether to determine the rear parking space 412 as the target parking space. For example, the automatic parking control unit 340 may provide an audio or video message indicating that the ego car 100 can park in the rear parking space 412, and provide a selection command menu for the driver to select a command whether or not to park into the rear parking space 412.

Upon receiving a selection command from the driver to park in the rear parking space 412, the automatic parking control unit 340 controls the reversing and steering of the ego car 100 to approach the rear parking space 412 and parks the ego car 100 in the rear parking space 412. Upon receiving a selection command from the driver indicating the driver's intention against parking in the rear parking space 412, the automatic parking control unit 340 advances the ego car 100 to continue searching for a candidate parking space.

The number of candidate parking spaces to be searched may be set to multiple by the range setting unit 320, requiring a search for multiple candidate parking spaces. When the existing parked vehicle 410 is detected as leaving the rear parking space 412, the automatic parking control unit 340 determines the detected rear parking space 412 as a candidate parking space and stores information on the rear parking space 412 as information on the candidate parking space.

Upon completion of the search of the plurality of candidate parking spaces, including the rear parking space 412, the automatic parking control unit 340 may display a screen for receiving a selection among the information on the plurality of candidate parking spaces, receive a selection command for one of the plurality of candidate parking spaces from the driver, and determine the target parking space according to the selection command. When a candidate parking space at the current location is selected as the target parking space, the automatic parking control unit 340 parks the ego car 100 in the target parking space. When a candidate parking space at a location other than the candidate parking space at the current location is selected as the target parking space, the automatic parking control unit 340 controls reversing and steering the ego car 100 to the selected target parking space to park the ego car 100 in the selected target parking space.

The technique by which the automatic parking control unit 340 determines the target parking space from the plurality of candidate parking spaces and moves and parks the ego car 100 into the target parking space is beyond the scope of the present disclosure, and therefore, further detailed description thereof is omitted.

While searching for candidate parking spaces, the automatic parking control unit 340 may generate a parking space map including location information of a parking space, occupancy status, size of the occupying vehicle, and size of the parking space for each of parking spaces 411, 412, 413, 414, 415, 416 around the ego car 100 as shown in FIG. 4A. The automatic parking control unit 340 may receive the parking space map in real-time from a parking lot control center.

The rear environment detection unit 330 detects objects behind the ego car 100 by using vehicle sensors such as the wide-angle camera 101 and the lidar sensor 102.

When the rear environment detection unit 330 detects the movement of a new first object behind the ego car 100, it recognizes the rear parking space 412 near the first object and determines whether the detected rear first object is a vehicle approaching the ego car 100 or the existing parked vehicle 410 leaving the rear parking space 412.

The rear environment detection unit 330 may use the parking space map to detect whether the existing parked vehicle is leaving the rear parking space 412.

The rear environment detection unit 330 may compare the initial detection location of the first object to the parking space location information stored in the parking space map to obtain information on the corresponding rear parking space 412.

The rear environment detection unit 330 compares the size of the first object with the size of the occupying vehicle included in the information on the rear parking space 412 to determine whether the first object is the existing parked vehicle 410.

When the rear environment detection unit 330 confirms that the first object is the existing parked vehicle 410, it determines whether the existing parked vehicle 410 is leaving the rear parking space 412 by checking the direction of travel of the existing parked vehicle 410, as shown in FIG. 4B.

Upon determining that the existing parked vehicle 410 has completely left the rear parking space 412, the automatic parking control unit 340 determines the rear parking space 412 as a candidate parking space that has been searched.

The rear environment detection unit 330 may also determine whether the rear parking space 412 has become a newly available parking space from vehicle to everything (V2X) information received from the parking lot control center.

The parking lot control center may receive information from all vehicles in the parking lot equipped with V2X terminals, such as location information, size of the vehicle, and whether the vehicle is parked or not. The parking lot control center may also determine whether the rear parking space 412 is occupied by receiving signals indicative of occupancy of the rear parking space 412 from detection sensors installed at locations such as the road surface of the rear parking space 412 to tell the occupancy status of the rear parking space 412.

The parking lot control center may transmit the V2X information which includes the information related to whether the rear parking space 412 is occupied to all vehicles in the parking lot including the ego car 100.

The automatic parking control unit 340 may receive the V2X information from the parking lot control center, and update the parking space map based on the received V2X information.

When the parking space map is updated based on the V2X information received from the parking lot control center, the rear environment detection unit 330 may check whether the content of the updated parking space map indicates that the rear parking space 412 is available for parking.

In this manner, the rear environment detection unit 330 may use the updated parking space map based on V2X information to determine whether the rear parking space 412 is available for parking, or, in an environment where no V2X information can be received, may use vehicle sensors such as the lidar sensor 102 and/or the wide-angle camera 101 to determine whether the rear parking space 412 is available for parking.

When the rear environment detection unit 330 determines that the rear parking space 412 is available for parking, the automatic parking control unit 340 may provide a rear parking space detection alarm to the driver of the ego car 100. The rear parking space detection alarm may be provided by voice and may be accompanied by a display of the location of the rear parking space 412 on a screen of a display device of the ego car 100. In this example, the automatic parking control unit 340 uses the location information of the parking space included in the parking space map to render the location of the rear parking space 412 to be displayed.

Figure 5:
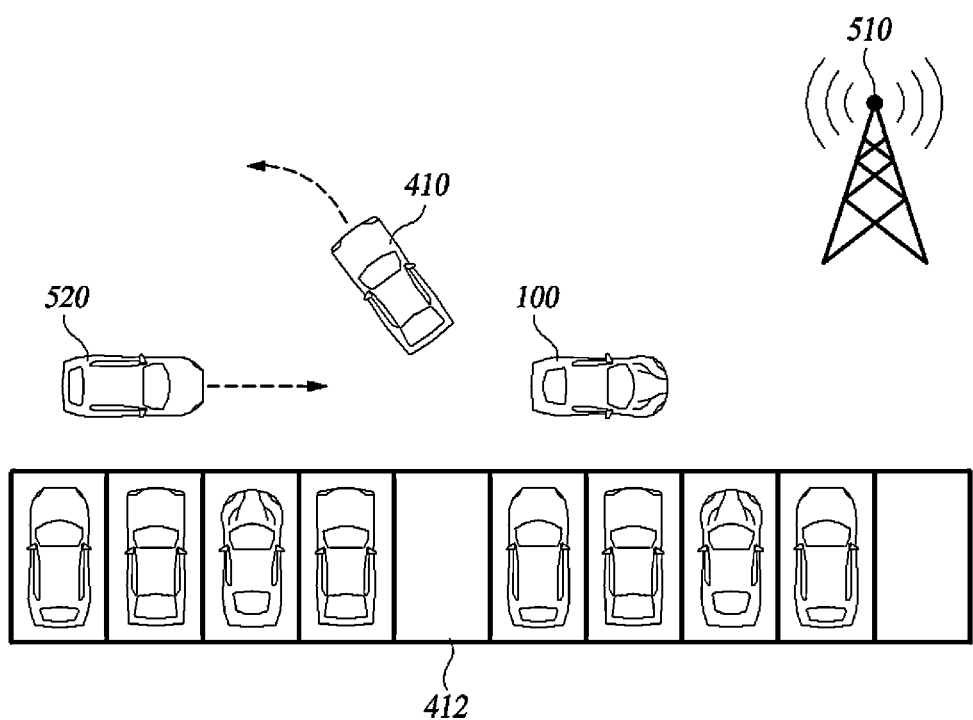
FIG. 5 is a diagram illustrating a situation where a trailing vehicle appears from behind while the ego car 100 is moving backward to park in a rear parking space 412.

FIG. 5 is a diagram illustrating a situation where a trailing vehicle appears from behind while the ego car 100 is moving backward to park in a rear parking space 412.

The automatic parking control unit 340 utilizes V2X information received from the parking lot control center 510 or image information obtained from a vehicle sensor mounted at the rear of the ego car 100 as a basis for determining the rear parking space 412 as a target parking space, thereby controlling the ego car 100 to be parked into the rear parking space 412.

In the process of controlling reversing and steering the ego car 100 into the rear parking space 412, which is determined to be the target parking space, the automatic parking control unit 340 checks whether there is a detection of a third trailing vehicle 520 approaching the rear parking space 412.

The detection of the third trailing vehicle 520 approaching the vicinity of the rear parking space 412 may be performed by the rear environment detection unit 330.

The automatic parking control unit 340 may determine whether the ego car 100 when reversing is likely to collide with the trailing vehicle 520, based on the speed and direction of travel of the trailing vehicle 520. Upon determining that the ego car 100, when going in reverse, may possibly collide with the trailing vehicle 520, the automatic parking control unit 340 may abandon parking in the rear parking space 412 and again search for a candidate parking space in the front (i.e., in a forward direction of travel of the ego car 100).

When the automatic parking control unit 340 detects the trailing vehicle 520 approaching the rear parking space 412 from behind the ego car 100, and upon determining that no collision of the ego car 100 when reversing is likely with the trailing vehicle 520, the automatic parking control unit 340 may determine a parking priority between the ego car 100 and the trailing vehicle 520 for the rear parking space 412.

The parking priority between the ego car 100 and the trailing vehicle 520 may be determined based on the sensor data detected by the vehicle sensors 101, 102. The sensor data may include the speed of the trailing vehicle, an acceleration of the trailing vehicle 520, the direction of travel of the trailing vehicle 520, a lateral distance between the ego car 100 and the trailing vehicle 520, a distance between the trailing vehicle 520 and the rear parking space 412, a distance between the ego car 100 and the rear parking space 412, and the like.

For example, upon determining that the speed of the trailing vehicle 520 is faster than the reversing speed of the ego car 100, that the trailing vehicle 520 is closer to the rear parking space 412 than the ego car 100, and that the lateral distance from the ego car 100 reveals that the trailing vehicle 520 is traveling toward the location of the ego car 100, the automatic parking control unit 340 may determine that the trailing vehicle 520 has a higher parking priority than the ego car 100.

However, if the ego car 100 is closer to the rear parking space 412 than the trailing car 520, the automatic parking control unit 340 may determine that the ego car 100 has a higher parking priority than the trailing car 520.

Upon determining, based on the lateral distance between the ego car 100 and the trailing vehicle 520 and the direction of travel of the trailing vehicle 520, that the trailing vehicle 520 is moving in the direction of overtaking the ego car 100, which indicates that the trailing vehicle 520 is not approaching the rear parking space 412, the automatic parking control unit 340 may determine that the trailing vehicle 520 has no intent to park in the rear parking space 412.

The automatic parking control unit 340 may determine parking priority in a variety of ways, including but not limited to the methods described in at least one embodiment of the present disclosure.

The parking priority may also be determined by the parking lot control center 510. Where both the ego car 100 and the trailing vehicle 520 are equipped with terminals performing V2X functions, the parking lot control center 510 may determine parking priority within the parking lot by receiving information on parking spaces within the parking lot, the location of the ego car 100 and the location of the trailing vehicle 520 in real-time, and information on parking intentions of the respective vehicles in the parking lot.

The automatic parking control unit 340 may be implemented to be responsive to a detection of the trailing vehicle 520 approaching the rear parking space 412 from behind the ego car 100 with the rear parking space 412 found to be available for parking, for transmitting information on the rear parking space 412 and the parking intent of the ego car 100 to the parking lot control center 510. The parking lot control center 510 may determine a parking priority based on the presence of the trailing vehicle 520 approaching the rear parking space 412 and whether the parking intent of the trailing vehicle 520 shows faster than the parking intent of the ego car 100 (i.e., the trailing vehicle 520 arriving at the rear parking space 412 faster than the ego car 100). The parking lot control center 510 may determine the parking priority between the ego car 100 and the trailing vehicle 520 for the rear parking space 412, and transmit parking-related information including the parking priority information related to the rear parking space 412 to the ego car 100 and the trailing vehicle 520, respectively.

Upon receiving the parking-related information related to the rear parking space 412, the automatic parking control unit 340 may determine that the parking priority of the ego car 100 is high or low for the rear parking space 412 based on the parking-related information received from the parking control center 510.

If no priority information is received from the parking lot control center 510, the automatic parking control unit 340 may determine that the trailing car 520 has no intent to park in the rear parking space 412. Upon determining that the trailing vehicle 520 has no intent to park in the rear parking space 412, the automatic parking control unit 340 performs the controlled reversing and steering of the ego car 100 to park the same in the rear parking space 412.

Additionally, upon determining that the ego car 100 has a higher parking priority for the rear parking space 412 than the trailing vehicle 520, the automatic parking control unit 340 performs the controlled reversing and steering of the ego car 100 to park the same in the rear parking space 412.

Upon determining that the trailing vehicle 520 has a higher parking priority than the ego car 100, the automatic parking control unit 340 excludes the rear parking space 412 from the candidate parking spaces and further searches for other candidate parking spaces.

The automatic parking control unit 340 may be responsive to a detection of a trailing vehicle 520 approaching the rear parking space 412 from behind the ego car 100, for displaying an indication externally of the ego car 100 to indicate the parking intentions of the ego car 100. In this example, indications of the parking intentions of the ego car 100 may include beaming the ego car 100's hazard lights (or turn signals), reversing, slowing down, and stopping. For example, the parking intent of the ego car 100 may be indicated by reversing and steering the ego car 100 with its hazard lights turned on, toward the rear parking space 412.

Further, where the ego car 100 is equipped with a rear display capable of displaying text externally of the ego car 100, the automatic parking control unit 340 may display text on the rear display to indicate the parking intent of the ego car 100.

Additionally, where the ego car 100 is equipped with an external light source for indicating the parking direction and parking intention toward the ground behind the ego car 100, the automatic parking control unit 340 may indicate the rear parking intention by injecting light toward the ground by using the external light source. For example, where the ego car 100 is equipped with a first light source on the rear left side and a second light source on the rear right side of the ego car 100, the parking intent to park in the parking space located on the rear left side may be indicated by directing the first light source toward the ground, and the parking intent to park in the parking space located on the rear right side may be indicated by directing the second light source toward the ground.

Even when the ego car 100 has externally indicated a parking intent, the trailing vehicle 520 may still attempt to park in the rear parking space 412.

In this case, the automatic parking control unit 340 may determine the parking intent of the trailing vehicle 520 to determine whether the ego car 100 should attempt to park in the rear parking space 412.

When the automatic parking control unit 340 detects the trailing vehicle 520 approaching the rear parking space 412 by its emitted beeping sound or turned-on high beams, the automatic parking control unit 340 may provide a trailing vehicle approach alarm to the driver of the ego car 100 to notify the driver of the presence of the trailing vehicle 520. When providing the trailing vehicle approach alarm, the automatic parking control unit 340 may also provide information to the driver of the ego car 100, such as whether the trailing vehicle 520 emits a beeping sound, whether it emits high beams, and the trailing vehicle's 520 approach speed (including whether it accelerates or decelerates).

Further, the automatic parking control unit 340 may compare the approach speed of the trailing vehicle 520 to the reversing speed of the ego car 100 to provide information to the driver about which vehicle is more accessible to the rear parking space 412 (i.e., which vehicle will reach the rear parking space 412 first), and whether it is more appropriate for the driver to park in the rear parking space 412 or to find a different candidate parking space.

Additionally, when the trailing vehicle 520 is approaching the rear parking space 412 by accelerating while generating both beeps and high beams, a notification may be provided to the driver of the ego car 100 recommending that the driver abandon parking in the rear parking space 412.

When providing the trailing vehicle approach alarm, the automatic parking control unit 340 provides a screen for the driver to select whether to park in the rear parking space 412, receives a response from the driver, and determines whether to park in the rear parking space 412 based on the received response.

Figure 6:
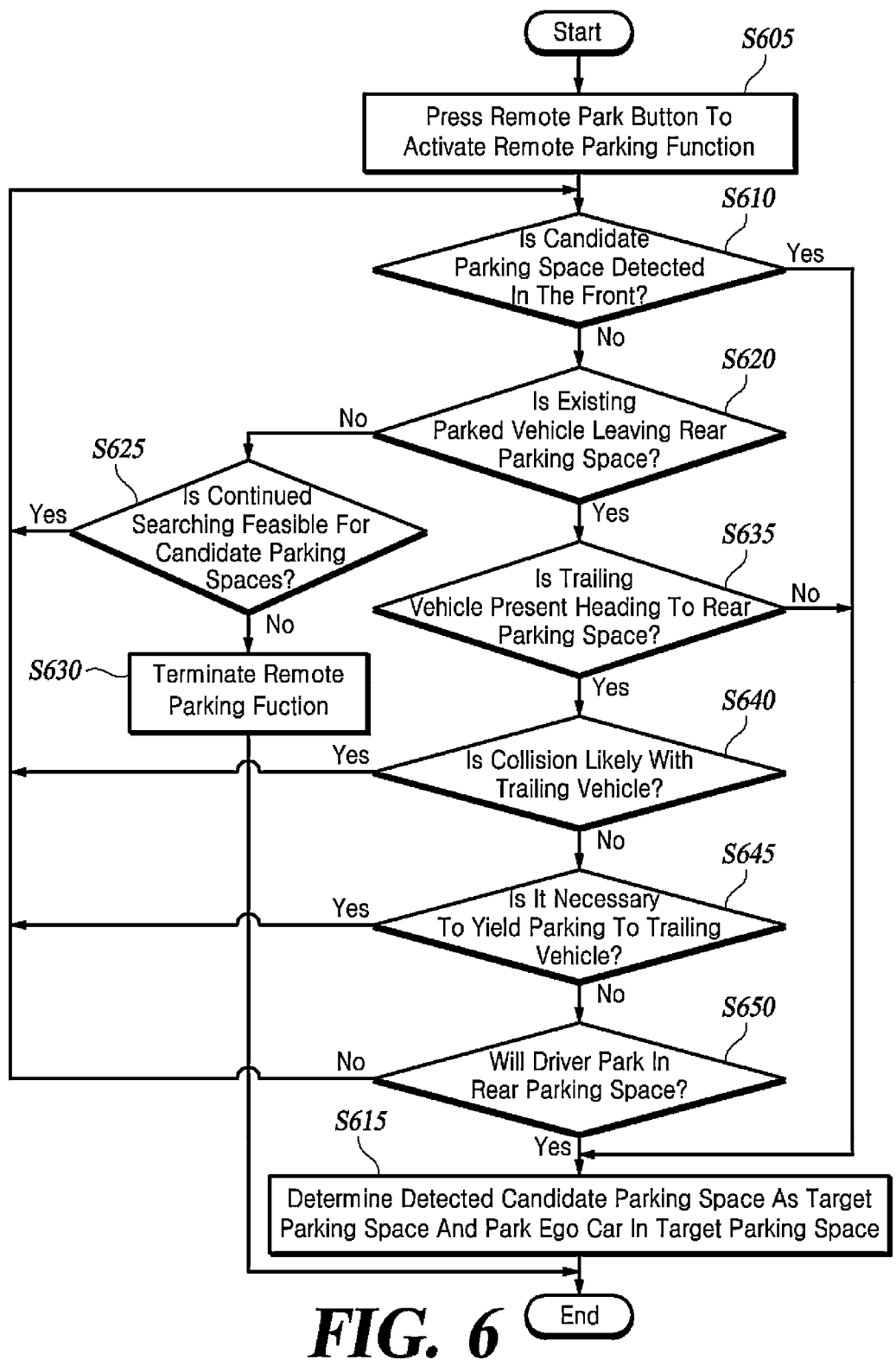
FIG. 6 is a flowchart of an autonomous parking assistance method according to at least one embodiment of the present disclosure.

FIG. 6 is a flowchart of an autonomous parking assistance method according to at least one embodiment of the present disclosure.

Hereinafter, FIGS. 1-6 are referred to together to describe the autonomous parking assistance method according to at least one embodiment.

To activate the remote parking function, the autonomous parking assistance apparatus 300 is operated with a remote parking button depressed in the ego car 100 (S605).

The automatic parking control unit 340 searches for a candidate parking space among parking spaces in front of the ego car 100 and checks whether a candidate parking space has been detected in front of the ego car 100 (S610).

When a candidate parking space is detected in front of the ego car 100, the automatic parking control unit 340 determines the detected candidate parking space as a target parking space and controls the ego car 100 to park the same in the target parking space (S615).

When no candidate parking space is detected in front of the ego car 100, the automatic parking control unit 340 checks whether an existing parked vehicle 410 is leaving a parking space 412 behind the ego car 100 (S620).

In Step S620, with no detection of an existing parked vehicle 410 leaving the rear parking space 412, the automatic parking control unit 340 checks whether it can continue to search for candidate parking spaces (S625).

In Step S625, upon determining that a continued search of the candidate parking space is not feasible, the automatic parking control unit 340 abandons the remote parking function and terminates the search for the candidate parking space (S630).

In Step S625, upon confirming that the continued search of the candidate parking space is feasible, the automatic parking control unit 340 proceeds to Step S610 to continue searching for the candidate parking space in front of the ego car 100.

In Step S620, upon detecting an existing parked vehicle 410 leaving the rear parking space 412, the automatic parking control unit 340 determines whether there is a trailing vehicle 520 that is heading to the rear parking space 412 (S635).

In the absence of the trailing vehicle 520 heading to the rear parking space 412, the automatic parking control unit 340 proceeds to Step S615 to determine the rear parking space 412 as the target parking space and controls the ego car 100 to park the same in the target parking space.

Upon confirming that the trailing vehicle 520 is heading toward the rear parking space 412, the automatic parking control unit 340 determines whether a collision is likely between the trailing vehicle 520 and the ego car 100 (S640).

Upon determining that a collision is likely between the trailing vehicle 520 and the ego car 100, the automatic parking control 340 proceeds to Step S610 to continue searching for candidate parking spaces in front of the ego car 100.

Upon confirming that no collision is likely between the trailing vehicle 520 and the ego car 100, the automatic parking control unit 340 determines whether it is necessary to yield parking to the trailing vehicle 520 based on a result of performing the behavior prediction of the trailing vehicle 520 or the parking priority information received from the parking control center 510 (S645), as discussed above.

When the automatic parking control unit 340 determines that it needs to yield parking in the rear parking space 412 to the trailing vehicle 520 based on the result of performing the behavior prediction or the parking priority information received from the parking lot control center 510, the automatic parking control 340 proceeds to Step S610 to continue searching for candidate parking spaces in front of the ego car 100.

Upon determining that the ego car 100 has a high parking priority for the rear parking space 412 based on the result of performing the behavioral prediction or the parking priority information received from the parking lot control center 510, the automatic parking control unit 340 receives a selection command from the driver about whether to proceed with parking in the rear parking space 412 (S650).

The automatic parking control unit 340 displays contents related to the selection command input and receives the selection command from the driver for allowing the driver to select whether to proceed with parking in the rear parking space 412.

When the driver selects to proceed with parking in the rear parking space 412, the automatic parking control unit 340 proceeds to Step S615 to determine the rear parking space 412 as the target parking space and controls the ego car 100 to park the same in the target parking space.

When the driver has selected to abandon the parking progression for the rear parking space 412, the automatic parking control unit 340 proceeds to Step S610 to continue searching for candidate parking spaces in front of the ego car 100.

The apparatus or method according to the present disclosure may have the respective components arranged to be implemented as hardware or software, or hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. The computer-readable recording mediums may further include transitory media such as a data transmission medium. Further, the computer-readable recording medium can be distributed in computer systems connected via a network, wherein the computer-readable codes can be stored and executed in a distributed mode.

Although the steps in the respective flowcharts/timing charts are described to be sequentially performed, they merely instantiate the technical idea of some embodiments of the present disclosure. Therefore, a person having ordinary skill in the pertinent art could perform the steps by changing the sequences described in the respective flowcharts/timing charts or by performing two or more of the steps in parallel, and hence the steps in the respective flowcharts/timing charts are not limited to the illustrated chronological sequences.

According to at least one embodiment, the present disclosure can expand the scope of operation of the remote automatic parking function by enabling the automatic parking function to be performed even with a backward detection of a parkable space among the rear parking spaces.

Furthermore, by controlling autonomous parking with parking space information received from a parking control center and information on a trailing vehicle, the present disclosure can provide a better mobile environment with proactive handling of various situations.

It should be noted that the effects of the present disclosure are not limited to those mentioned above, and other effects not mentioned should be apparent to those having ordinary skill in the art from the above description.

Although embodiments of the present disclosure have been described for illustrative purposes, those having ordinary skill in the art will appreciate that various modifications, additions, and substitutions are possible, without departing from the idea and scope of the claimed invention. Therefore, embodiments of the present disclosure have been described for the sake of brevity and clarity. The scope of the technical idea of the embodiments of the present disclosure is not limited by the illustrations. Accordingly, one of ordinary skill in the art would understand the scope of the claimed invention is not to be limited by the above explicitly described embodiments but by the claims and equivalents thereof.

| REFERENCE NUMERALS | |
|---|---|
| 100: ego car | 101: wide-angle camera |
| 102: Lidar sensor | 110: remote autonomous parking zone |
| 111: first parking space | 112: second parking space |
| 210: first spot | |
| 200: autonomous parking assist apparatus | |
| 310: ambient information acquisition unit | |
| 320: range setting unit | 330: rear environment detection unit |
| 340: automatic parking control unit | 410: existing parked vehicle |
| 411, 412, 413, 414, 415, 416: perimeter parking space | |
| 412: rear parking space | 415: front unoccupied parking space |
| 510: parking lot control center | 520: trailing vehicle |

What is claimed is:

1. An apparatus for autonomous parking assistance, the apparatus comprising:
    a range setting unit configured to set a search range for searching for at least one candidate parking space to determine a target parking space for assisting parking of an ego car in a parking lot;
    a rear environment detection unit configured to detect whether an existing parked vehicle in a rear parking space located behind the ego car leaves; and
    an automatic parking control unit configured to control parking of the ego car based on the search range and whether the existing parked vehicle leaves,
    wherein the automatic parking control unit, in response to detecting a trailing vehicle approaching the rear parking space from behind the ego car, determines a parking priority between the ego car and the trailing vehicle for the rear parking space, and controls the parking of the ego car according to the parking priority.

2. The apparatus of claim 1, wherein the automatic parking control unit controls parking of the ego car by considering the search range along with information on the rear parking space, in response to detecting the existing parked vehicle leaving while searching for the at least one candidate parking space.

3. The apparatus of claim 2, wherein the automatic parking control unit, in response to detecting the existing parked vehicle leaving, receives a selection by a driver of the ego car as to whether to determine the rear parking space as the target parking space and controls the parking of the ego car based on the selection by the driver.

4. The apparatus of claim 2, wherein the automatic parking control unit, in response to detecting the existing parked vehicle leaving, provides a rear parking space detection alarm to a driver of the ego car.

5. The apparatus of claim 4, wherein the automatic parking control unit displays a location of the rear parking space.

6. The apparatus of claim 1, wherein the rear environment detection unit detects whether or not the existing parked vehicle is leaving by taking account of a size of the existing parked vehicle and a direction of travel of the existing parked vehicle.

7. The apparatus of claim 1, wherein
    the automatic parking control unit generates a parking space map including location information and occupancy status of parking spaces around the ego car while searching for the at least one candidate parking space based on the search range, and
    the rear environment detection unit detects whether or not the existing parked vehicle is leaving based on the parking space map.

8. The apparatus of claim 1, wherein
    the automatic parking control unit receives from a control center a parking space map including location information and occupancy status of parking spaces in the parking lot, and
    the rear environment detection unit detects whether or not the existing parked vehicle is leaving based on the parking space map.

9. The apparatus of claim 1, wherein the automatic parking control unit determines the parking priority based on a speed of the trailing vehicle, a direction of travel of the trailing vehicle, and a distance between the trailing vehicle and the rear parking space.

10. The apparatus of claim 1, wherein the automatic parking control unit controls the parking of the ego car according to parking priority information for the rear parking space received from a control center.

11. The apparatus of claim 1, wherein the automatic parking control unit, in response to detecting a trailing vehicle approaching the rear parking space from behind the ego car, displays an indication of a parking intention of the ego car externally.

12. An apparatus for autonomous parking assistance, the apparatus comprising:
    a range setting unit configured to set a search range for searching for at least one candidate parking space to determine a target parking space for assisting parking of an ego car in a parking lot;
    a rear environment detection unit configured to detect whether an existing parked vehicle in a rear parking space located behind the ego car leaves; and
    an automatic parking control unit configured to control parking of the ego car based on the search range and whether the existing parked vehicle leaves,
    wherein the automatic parking control unit, in response to detecting a trailing vehicle approaching the rear parking space from behind the ego car, illuminates a light toward a rear ground surface of the ego car, the light indicating the parking intention and a parking direction of the ego car.

13. An apparatus for autonomous parking assistance, the apparatus comprising:
- a range setting unit configured to set a search range for searching for at least one candidate parking space to determine a target parking space for assisting parking of an ego car in a parking lot;
- a rear environment detection unit configured to detect whether an existing parked vehicle in a rear parking space located behind the ego car leaves; and
- an automatic parking control unit configured to control parking of the ego car based on the search range and whether the existing parked vehicle leaves,
- wherein the automatic parking control unit, in response to detecting a trailing vehicle approaching the rear parking space from behind the ego car, determines a parking intention of the trailing vehicle for the rear parking space based on at least one of generating a warning sound, illuminating high beams, and approaching speed by the trailing vehicle.

14. A method for autonomous parking assistance, the method comprising:
- setting a search range for searching for at least one candidate parking space to determine a target parking space for assisting parking of an ego car in a parking lot;
- detecting whether an existing parked vehicle in a rear parking space located behind the ego car leaves; and
- controlling parking of the ego car based on the search range and whether the existing parked vehicle leaves,
- wherein controlling parking of the ego car comprises:
- in response to detecting a trailing vehicle approaching the rear parking space from behind the ego car, determining a parking priority between the ego car and the trailing vehicle for the rear parking space; and
- controlling the parking of the ego car according to the parking priority.

15. The method of claim 14, wherein controlling parking of the ego car is performed by considering the search range along with information on the rear parking space, in response to detecting the existing parked vehicle leaving while searching for the at least one candidate parking space.

16. The method of claim 15, wherein controlling parking of the ego car is performed by providing a rear parking space detection alarm to a driver of the ego car in response to detecting the existing parked vehicle leaving.

17. The method of claim 14, wherein detecting is performed by detecting whether or not the existing parked vehicle is leaving by taking account of a size of the existing parked vehicle and a direction of travel of the existing parked vehicle.

18. The method of claim 14, wherein controlling parking of the ego car comprises generating a parking space map including location information and occupancy status of parking spaces around the ego car while searching for the at least one candidate parking space based on the search range, and
- wherein whether or not the existing parked vehicle leaves is detected based on the parking space map.

19. A method for autonomous parking assistance, the method comprising:
- setting a search range for searching for at least one candidate parking space to determine a target parking space for assisting parking of an ego car in a parking lot;
- detecting whether an existing parked vehicle in a rear parking space located behind the ego car leaves; and
- controlling parking of the ego car based on the search range and whether the existing parked vehicle leaves,
- wherein controlling parking of the ego car comprises:
- in response to detecting a trailing vehicle approaching the rear parking space from behind the ego car, illuminating a light toward a rear ground surface of the ego car, the light indicating the parking intention and a parking direction of the ego car.

20. A method for autonomous parking assistance, the method comprising:
- setting a search range for searching for at least one candidate parking space to determine a target parking space for assisting parking of an ego car in a parking lot;
- detecting whether an existing parked vehicle in a rear parking space located behind the ego car leaves; and
- controlling parking of the ego car based on the search range and whether the existing parked vehicle leaves,
- wherein controlling parking of the ego car comprises:
- in response to detecting a trailing vehicle approaching the rear parking space from behind the ego car, determining a parking intention of the trailing vehicle for the rear parking space based on at least one of generating a warning sound, illuminating high beams, and approaching speed by the trailing vehicle.

* * * * *